US009251137B2

(12) United States Patent
Chen et al.

(10) Patent No.: US 9,251,137 B2
(45) Date of Patent: *Feb. 2, 2016

(54) METHOD OF TEXT TYPE-AHEAD

(75) Inventors: Yen-Fu Chen, Austin, TX (US); Fabian F. Morgan, Austin, TX (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 845 days.

This patent is subject to a terminal disclaimer.

(21) Appl. No.: 11/766,193

(22) Filed: Jun. 21, 2007

(65) Prior Publication Data

US 2008/0320411 A1    Dec. 25, 2008

(51) Int. Cl.
*G06F 17/00* (2006.01)
*G06F 17/27* (2006.01)
*G06F 3/023* (2006.01)

(52) U.S. Cl.
CPC ............ *G06F 17/276* (2013.01); *G06F 3/0237* (2013.01)

(58) Field of Classification Search
CPC .............................. G06F 17/276; G06F 3/0237
USPC .......... 715/200, 256–261, 273, 276, 255, 763
See application file for complete search history.

(56) References Cited

U.S. PATENT DOCUMENTS

| | | | |
|---|---|---|---|
| 4,464,730 A | | 8/1984 | Lawrence et al. |
| 5,251,131 A | | 10/1993 | Masand et al. |
| 5,623,406 A | * | 4/1997 | Ichbiah .............................. 704/3 |
| 5,634,084 A | * | 5/1997 | Malsheen et al. ............. 704/260 |
| 5,752,051 A | | 5/1998 | Cohen |
| 5,772,585 A | | 6/1998 | Lavin et al. |
| 5,819,260 A | * | 10/1998 | Lu et al. ......................... 707/700 |
| 5,896,321 A | * | 4/1999 | Miller et al. ............. 365/189.15 |

(Continued)

FOREIGN PATENT DOCUMENTS

| | | |
|---|---|---|
| EP | 1-109-115 A1 | 12/1999 |
| WO | WO 2004/010323 A2 | 1/2004 |
| WO | 2006/055120 A2 | 5/2006 |

OTHER PUBLICATIONS

ISR including PCT transmittal, From the International Searching Authority, mailed Nov. 25, 2008, Applicant: International Business Machines Corporation, International Application No. PCT/EP2008/057537, pp. 5.

(Continued)

*Primary Examiner* — Cesar Paula
*Assistant Examiner* — David Faber
(74) *Attorney, Agent, or Firm* — Schmeiser, Olsen & Watts, LLP; Mark C. Vallone (57) ABSTRACT

Methods and arrangements of text entry are discussed. Embodiments include transformations, code, state machines or other logic to enter text select text based upon the number of words in phrases of the text, upon the number of letters in words of the text, or upon other patterns of the text. The method may also involve indexing the selected text, matching text currently being entered by the user into an application to a portion of a segment of the indexed text, and entering a remaining portion of the segment of the indexed text into the application based upon the matching. In many embodiments, the text may be selected from the text entered into any of several applications. In a few embodiments, the text may be selected from sources specified by a user. In further embodiments, the sources may constitute data files.

30 Claims, 4 Drawing Sheets

(56) References Cited

U.S. PATENT DOCUMENTS

| | | | |
|---|---|---|---|
| 6,055,542 A | 4/2000 | Nielsen et al. | |
| 6,131,092 A | 10/2000 | Masand | |
| 6,208,339 B1 | 3/2001 | Atlas et al. | |
| 6,377,965 B1* | 4/2002 | Hachamovitch et al. | 715/203 |
| 6,564,213 B1 | 5/2003 | Ortega et al. | |
| 6,631,373 B1 | 10/2003 | Otani et al. | |
| 6,678,694 B1 | 1/2004 | Zimmermann et al. | |
| 6,816,578 B1 | 11/2004 | Kredo et al. | |
| 6,879,691 B1 | 4/2005 | Koretz | |
| 6,922,810 B1* | 7/2005 | Trower et al. | 715/256 |
| 7,003,446 B2 | 2/2006 | Trower et al. | |
| 7,027,192 B2 | 4/2006 | Kawai | |
| 7,113,803 B2 | 9/2006 | Dehlin | |
| RE39,326 E | 10/2006 | Comer et al. | |
| 7,146,571 B2 | 12/2006 | Bates et al. | |
| 7,149,970 B1* | 12/2006 | Pratley et al. | 715/257 |
| 7,181,497 B1 | 2/2007 | Appelman et al. | |
| 7,185,271 B2 | 2/2007 | Lee et al. | |
| 7,233,940 B2* | 6/2007 | Bamberger et al. | |
| 7,293,231 B1* | 11/2007 | Gunn et al. | 345/179 |
| 7,529,731 B2 | 5/2009 | Bier | |
| 7,558,778 B2 | 7/2009 | Carus et al. | |
| 7,558,792 B2 | 7/2009 | Bier | |
| 7,650,348 B2* | 1/2010 | Lowles et al. | 707/999.101 |
| 7,661,064 B2 | 2/2010 | Cicerone | |
| 7,679,534 B2* | 3/2010 | Kay et al. | 341/22 |
| 7,698,127 B2* | 4/2010 | Trower et al. | 704/9 |
| 7,702,731 B2 | 4/2010 | Lingafelt et al. | |
| 7,895,032 B2* | 2/2011 | Mullen | 704/9 |
| 7,979,457 B1* | 7/2011 | Garman | 707/768 |
| 8,024,176 B2* | 9/2011 | Carus et al. | 704/9 |
| 8,725,753 B2 | 5/2014 | Chen et al. | |
| 2002/0013705 A1* | 1/2002 | Jaepel et al. | 704/252 |
| 2003/0033287 A1 | 2/2003 | Shanahan et al. | |
| 2003/0033288 A1 | 2/2003 | Shanahan et al. | |
| 2003/0061200 A1 | 3/2003 | Hubert et al. | |
| 2003/0061201 A1 | 3/2003 | Grefenstette et al. | |
| 2003/0171910 A1* | 9/2003 | Abir | 704/1 |
| 2004/0039988 A1 | 2/2004 | Lee et al. | |
| 2005/0086596 A1* | 4/2005 | Koch et al. | 715/526 |
| 2005/0108630 A1 | 5/2005 | Wasson et al. | |
| 2005/0132297 A1 | 6/2005 | Milic-Frayling et al. | |
| 2005/0155017 A1 | 7/2005 | Berstis et al. | |
| 2005/0188330 A1 | 8/2005 | Griffin | |
| 2005/0289103 A1 | 12/2005 | Bier | |
| 2005/0289141 A1 | 12/2005 | Baluja | |
| 2006/0074980 A1 | 4/2006 | Sarkar | |
| 2006/0080303 A1 | 4/2006 | Sargent et al. | |
| 2006/0090154 A1 | 4/2006 | Bustelo et al. | |
| 2006/0106769 A1 | 5/2006 | Gibbs | |
| 2006/0165289 A1 | 7/2006 | Boss et al. | |
| 2006/0217953 A1* | 9/2006 | Parikh | 704/1 |
| 2006/0247915 A1 | 11/2006 | Bradford et al. | |
| 2007/0033217 A1 | 2/2007 | Basner | |
| 2007/0033275 A1 | 2/2007 | Toivonen et al. | |
| 2007/0050352 A1 | 3/2007 | Kim | |
| 2007/0061753 A1* | 3/2007 | Ng et al. | 715/816 |
| 2007/0076862 A1 | 4/2007 | Chatterjee et al. | |
| 2007/0100890 A1 | 5/2007 | Kim | |
| 2007/0133507 A1 | 6/2007 | Da Palma et al. | |
| 2007/0208998 A1 | 9/2007 | Cicerone | |
| 2007/0250504 A1 | 10/2007 | Chen et al. | |
| 2007/0250765 A1 | 10/2007 | Chen et al. | |
| 2007/0288451 A1* | 12/2007 | Meyer et al. | 707/5 |
| 2007/0296615 A1 | 12/2007 | Raguseo | |
| 2008/0010274 A1 | 1/2008 | Carus et al. | |
| 2008/0021924 A1 | 1/2008 | Hall et al. | |
| 2008/0065617 A1 | 3/2008 | Burke et al. | |
| 2008/0071708 A1 | 3/2008 | Dara et al. | |
| 2008/0155464 A1 | 6/2008 | Jones et al. | |
| 2008/0243841 A1 | 10/2008 | Bonnet et al. | |
| 2008/0263032 A1 | 10/2008 | Vailaya et al. | |
| 2008/0263033 A1 | 10/2008 | Vailaya et al. | |
| 2008/0270122 A1* | 10/2008 | Weir | 704/10 |
| 2008/0270351 A1 | 10/2008 | Thomsen | |
| 2008/0270382 A1 | 10/2008 | Thomsen et al. | |
| 2008/0270451 A1 | 10/2008 | Thomsen et al. | |
| 2008/0320411 A1 | 12/2008 | Chen et al. | |
| 2009/0132234 A1 | 5/2009 | Weikel | |
| 2009/0182741 A1 | 7/2009 | Chen et al. | |
| 2009/0271700 A1 | 10/2009 | Chen et al. | |
| 2010/0010989 A1 | 1/2010 | Li et al. | |
| 2014/0032614 A1* | 1/2014 | Gao et al. | 707/803 |

OTHER PUBLICATIONS

"Using Sure Type?", http://www.blackberry.com/solutions/pdfs/suetype blackberry 7100v.pdf; 2005 Research in Motion Limited, pp. 2.

Capra, III, Robert G., et al., "Using Web Search Engines to Find and Refind Information", IEEE Computer, Oct. 2005, pp. 36-42.

Bast, Holger, et al., "Type Less, Find More: Fast Autocompletion search with a Succinct Index", SIGIR '06, Seattle WA, Aug. 6-11, 2006, pp. 364-371.

Wusteman, Judith, et al., "Using Ajax to Empower Dynamic Searching", Information Technology and Libraries, vol. 25, No. 2, Jun. 2006, pp. 1-16.

Bangalore, Anantha, et al., "UMLSKS Suggest: An Auto-complete Feature for the UMLSKS Interface Using AJAX", AMIA 2006 Symposium Proceedings, Copyright 2006, p. 851.

Hyvonen, Eero, et al., "Semantic Autocompletion", ASWC 200, LNCS 4185, Springer-Verlag, Berlin, Germany, Copyright, 2006, pp. 739-751.

Lin, Shian-Hua, et al., "Discovering Informative Content Blocks from Web Documents", SIGKDD '02, Edmonton, Alberta, Canada, Jul. 23-26, 2002, pp. 588-593.

Kellar, Melanie, et al., "Using Web Browser Interactions to Predict Task", WWW 2006, Edinburgh, Scotland, May 23-26, 2006, pp. 843-844.

"n-gram", Wikipedia, downloaded from: en.wikipedia.org/wiki/N-gram on Apr. 23, 2010, pp. 1-5.

Non-Final Office Action dated Apr. 27, 2010 for U.S. Appl. No. 12/015,361.

U.S. Appl. No. 13/603,884, filed Sep. 5, 2012; Confirmation No. 9107; First Named Inventor: Yen-Fu Chen.

* cited by examiner

METHOD OF TEXT TYPE-AHEAD

FIELD

The present invention is in the field of text entry. More particularly, the present invention relates to methods and arrangements to auto-complete user-entered text.

BACKGROUND

Users of applications that accept text entry, such as Instant Message (IM) clients, often type keywords or phrases that they have previously typed. An IM user may use some words or phrases regularly. Examples include information about the user's availability such as, "Sorry, on a call right now will ping you later"; "long" keywords or phrases, such as "polymorphism" or "IBM Tivoli Composite Application Manager (ITCAM)": and a referral for a certain expertise. For instance, an IM user may type a message to another contact saying: "For the ABC problem in product XYZ, you can contact Joe Somebody, as he is the developer of that component. His short name is joesomebody@us.ibm.com".

In current applications that accept text entry, entering text that a user has previously entered may require manually performing a laborious and time-consuming series of steps. Below is an example of the manual method, in a scenario in which a user repeatedly asks permission to use a resource:

[Danny→Brent]:
Danny: "Are you using the CCTDEV machine? It won't accept my connection because someone else is logged on."
Brent: "No. Try checking with Dave."
[Danny→Dave]
Danny: "Are you using the CCTDEV machine? It won't accept my connection because someone else is logged on."
Dave: "No. Try checking with Sherry and Eileen."
[Danny→Sherry/Eileen]
Danny: "Are you using the CCTDEV machine? It won't accept my connection because someone else is logged on."

In this scenario, Danny continues to ask the same question and provide the same explanation to other IM users. To avoid retyping, Danny may perform the typical steps of copying and pasting. These steps include:

1. Locate the previous text. Right click on the Contact name>Choose Show>Chat History. To execute this step, Danny must know the person he was chatting with and the location of the text within the chat.
2. Search for the chat history text.
3. Highlight the text.
4. Hit Ctrl-C to copy.
5. Go to the new chat window.
6. Paste the text.
7. Modify the text as necessary.
8. Hit ENTER to send message.

These steps are time consuming and require knowledge of the source of the text to be reused.

SUMMARY OF THE INVENTION

The problems identified above are in large part addressed by methods and arrangements of text entry. One embodiment provides a method of text entry. The method may involve selecting text based upon the number of words in phrases of the text, upon the number of letters in words of the text, or upon other patterns of the text. The method may also involve indexing the selected text, matching text currently being entered by the user (current text) into an application to a portion of a segment of the indexed text, and entering a remaining portion of the segment of the indexed text into the application based upon the matching. In some embodiments, the current text may be matched to a portion of a single word, and the single word may be entered into the application. In many embodiments, the text may be selected from the text entered into any of several applications. In a few embodiments, the text may be selected from sources specified by a user. In further embodiments, the sources may constitute data files.

In several embodiments, a user may specify the patterns of text used for selecting. In some embodiments, the text may be selected from application windows closed without saving. In many embodiments, the indexing may include indexing a first collection of text entered by the user; receiving additional text entered by the user; and incrementally indexing the additional text. In several embodiments, the time for indexing may be based upon a time specified by a user. In various embodiments, the matching may be carried out in response to a keystroke or combination of keystrokes entered by the user. In a few embodiments, the method may involve displaying segments of the indexed text to the user through a user interface, where portions of the displayed segments were matched to current text. The method may also include a user selecting a displayed segment through a user interface, and entering a remaining portion of the one of the displayed segments of the indexed text. In some further embodiments, the segments may be displayed in an order specified by a user. In many further embodiments, the segments may be displayed in order of frequency of selection.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of text entry are contemplated. Embodiments include transformations, code, state machines or other logic to select text based upon the number of words in phrases of the text, upon the number of letters in words of the text, or upon other patterns of the text. The method may also involve indexing the selected text, matching text currently being entered by the user (current text) into an application to a portion of a segment of the indexed text, and entering a remaining portion of the segment of the indexed text into the application based upon the matching. In some embodiments, the current text may be matched to a portion of a single word, and the single word may be entered into the application. In many embodiments, the text may be selected from the combined text entered into any of several applications. In a few embodiments, the text may be selected from sources specified by a user. In further embodiments, the sources may constitute data files.

In several embodiments, a user may specify the patterns of text used for selecting. In some embodiments, the text may be selected from application windows closed without saving. In many embodiments, the indexing may include indexing a first collection of text entered by the user; receiving additional text entered by the user; and incrementally indexing the additional text. In several embodiments, the time for indexing may be based upon a time specified by a user. In various embodiments, the matching may be carried out in response to a keystroke or combination of keystrokes entered by the user. In a few embodiments, the method may involve displaying segments of the indexed text to the user through a user interface, where portions of the displayed segments were matched to current text. The method may also include entering a remaining portion of a displayed segment of the indexed text in response to a user selecting the displayed segment through the user interface. In some further embodiments, the segments may be displayed in an order specified by a user. In many further embodiments, the segments may be displayed in order of frequency of selection.

While specific embodiments will be described below with reference to particular circuit or logic configurations, those of skill in the art will realize that embodiments of the present invention may advantageously be implemented with other substantially equivalent configurations.

Figure 1:
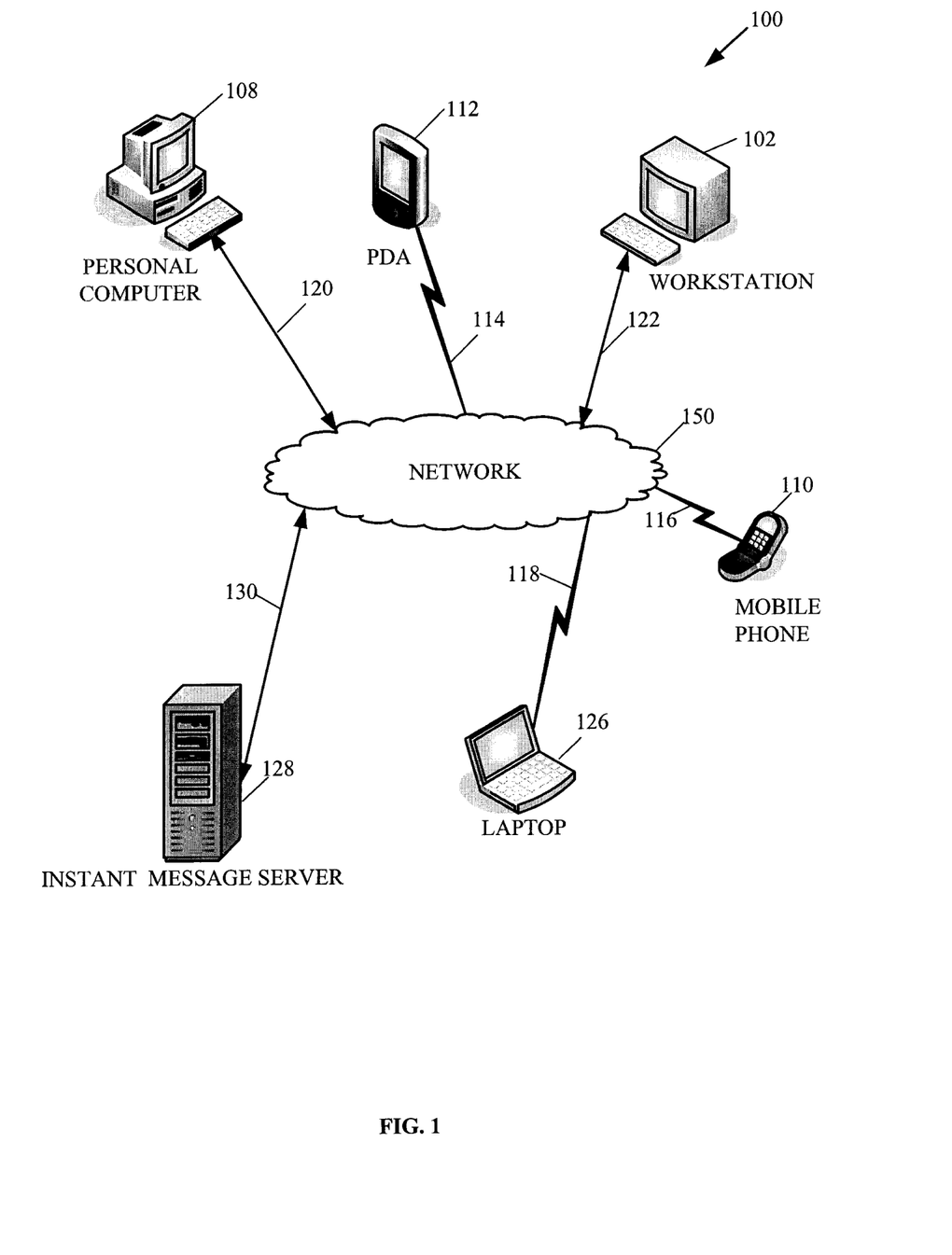
FIG. 1 is a network diagram of an embodiment of devices to enter text into applications.

FIG. 1 depicts a diagram of an embodiment of a networked system 100 of devices capable of entering text into applications. The system 100 includes a network 150, instant message server 128 connected to network 150 through wireline connection 130, and a variety of devices capable of entering text into applications, including:

workstation 102, a computer coupled to network 150 through wireline connection 122, personal digital assistant 112, coupled to network 150 through wireless connection 114, personal computer 108, coupled to network 150 through wireline connection 120, laptop computer 126, coupled to network 150 through wireless connection 118; and mobile phone 110, coupled to network 150 through wireless connection 116.

The devices 102, 108, 110, 112, and 126 may select text based upon patterns of the text, index the selected text, match text currently being entered by the user into an application to a portion of a segment of the indexed text, and enter a remaining portion of the segment of text into the application based upon the matching. The entering of a remaining portion of a segment in response to matching the portion is called an auto-completion or type-ahead feature. A segment may consist of a word, a phrase, a sentence, a paragraph, or other unit of text. A phrase may consist of a string of words terminated by particular punctuation marks, such as ",'' ";" "." or "?" or by line_return. A word may consist of a string of alpha-numeric characters terminated by whitespace or by particular punctuation marks.

Network 150, which may consist of the Internet or another wide area network, a local area network, or a combination of networks, may provide data communications among instant message server 128 and the devices 102, 108, 112, 126, and 110. Instant message server 128 may have installed and operative upon it software to enable users to communicate by instant messages across network 150. Examples of instant message programs include Microsoft's Windows Messenger, IBM's Lotus Sametime 7.5.1, Yahoo!® Messenger, and AOL's AIM®. Typically, a person at one of the devices 102, 108, 112, 126, and 110 may initiate an instant message chat session by invoking an instant message client program and identifying one or more additional people to participate in the chat session. The initiator may identify other desired participants in the chat session by accessing a directory and selecting individuals or groups of people listed in the directory. The client program may send to the instant message server 128 identifications, such as e-mail addresses, of the other desired participants.

In response, the instant message server 128 may attempt to connect to the client workstations or other computing devices of the other desired participants to determine if they are currently on-line. If the instant message server 128 successfully connects with a desired participant, it may create a chat session for the desired participant by invoking the participant's chat session client program and identifying the active members of the chat session. In addition, the instant message server 128 may notify the initiator of the desired participants who are not currently available for a chat session.

Instant message server 128 may then establish communications between the participants. In some implementations of chat client programs, communication between clients is done on a peer to peer level, i.e. directly from a user device such as devices 102, 108, 112, 126, and 110 to another user device without mediation by or assistance from instant message server 128. In other implementations, a message from one participant may be relayed through instant message server 128. In either implementation, a message sent by one participant is sent to all of the other participants and may be displayed on their user devices nearly in real time.

The arrangement of instant message server 128 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. For example, users may participate in an instant message chat session by establishing peer-to-peer connections or by visiting a web site. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

In addition, data processing systems useful according to various embodiments of the present invention may operate network programs other than instant message programs and may operate stand-alone programs. In many embodiments, data processing systems are not network connected or are not operating over the network.

Figure 2:
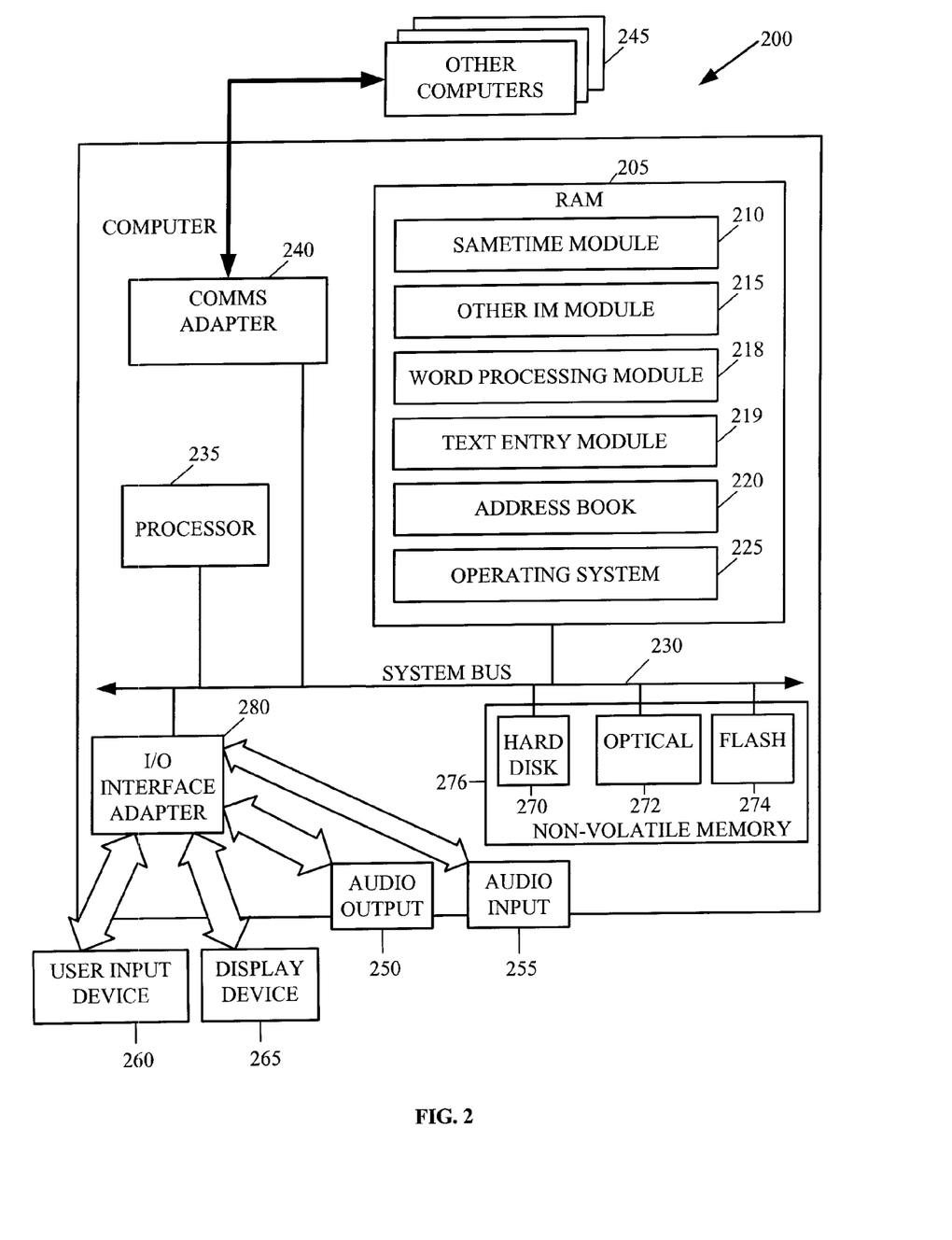
FIG. 2 depicts an embodiment of a computer capable of entering text into applications.

Turning to FIG. 2, depicted is an embodiment of a computer 200 capable of entering text into applications that includes random access memory (RAM) 205, a processor 235 or CPU, non-volatile memory 276, a communications adapter 240, and an Input/Output (I/O) interface adapter 280 connected by system bus 230. Stored in RAM 205 is Sametime module 210, another IM module 215, a word processing module 218, a text entry module 219, an address book 220, and an operating system 225.

Sametime module 210 and other IM module 215 may comprise computer program instructions for participating in instant message chat sessions. Word processing module 218 may comprise computer program instructions for creating and editing text. The computer program instructions may provide for generating windows and processing text that a user may enter into the windows.

Text entry module 219 may comprise computer program instructions to select text based upon patterns of the text, index the selected text, match text currently being entered by the user into an application to a portion of a segment of the indexed text, and enter a remaining portion of the segment of indexed text into the application based upon the matching. In the embodiment of FIG. 2, text entry module 219 may constitute a separate program that may provide a type-ahead feature for multiple applications, including Sametime module 210, other IM module 215, and word processing module 218. In some further embodiments, the type-ahead feature may complete text entered into any one of the programs 210, 215, and 218 based upon a match to a portion of a segment of text entered into any of the other programs 210, 215, and 218. For example, text entry module 219 may match a phrase a user types into a chat window of other IM module 215 to a portion of a phrase the user typed into Sametime module 210, and enter the remainder of the Sametime phrase into the chat window for the other IM module 215. In some of these embodiments, plug-ins to the programs 210, 215, and 218 may enable text entry module 219 to access text entered into the programs and to auto-complete text entered into the programs. A plug-in is an auxiliary program that enhances the capability of another program. The other program may provide a standard interface for plug-ins.

In many further embodiments, text entry module 219 may match text entered into one of the application programs 210, 215 and 218 against text in address book 220 and auto-complete the text based upon the contents of address book 220. A user may begin to type a name contained in the address book into a text-entry window of one of the application programs 210, 215, and 218, and text entry module 219 may enter the complete name in the window. In other further embodiments, text entry module 219 may match text currently entered into an application only against other text that had been entered into the same application.

The modules shown in RAM 205 are for explanation, not for limitation. In many other embodiments, text entry module 219 may constitute a module of a single program that accepts text entry. For example, text entry module 219 may form a component of an IM program, and may auto-complete phrases entered into the IM program based upon other text entered into the IM program. In some other embodiments, a text-entry module may access data files other than an address book, such as a company organization chart or an inventory list. In a few other embodiments, a text-entry module may auto-complete text entered into programs other than word-processing programs and instant message programs. For example, a text-entry module may auto-complete text entries to a translation program. A user may begin to enter text for translation. The text-entry module may match the text to text previously entered and auto-complete the text entry. The completed entry may then be translated by the translation program.

Operating system 225 may comprise UNIX™, Linux™, Microsoft Windows™, AIX™, IBM's i5/OS™, or other operating systems useful for auto-completion programs as will occur to those of skill in the art. Sametime module 210, other IM module 215, word processing module 218, text entry module 219, address book 220, and operating system 225 (components of software) are shown in RAM 205 in FIG. 2, but many components of such software may be stored in non-volatile memory 276 also. Further, while the components of such are shown simultaneously present in RAM, in some other embodiments, only some of the components of RAM 205 may be present at any given time.

I/O interface adapter 280 implements user-oriented I/O through, for example, software drivers and computer hardware for controlling output to display devices such as display device 265 and audio output device 250 as well as user input from user input device 260 and audio input device 255. User input device 260 may include both a keyboard and a mouse. Some embodiments may include other user input devices such as speech interpreters, bar code scanners, text scanners, tablets, touch screens, and/or other forms of user input devices. Audio output 250 may include speakers or headphones and audio input device 255 may include a microphone or other device to capture sound. Non-volatile computer memory 276 may be implemented as a hard disk drive 270, optical disk drive 272, electrically erasable programmable read-only memory space (EEPROM or Flash memory) 274, RAM drives (not shown), or as any other kind of computer memory as will occur to those of skill in the art.

Communications adapter 240 may implement the hardware level of data communications through which one computer sends data communications to other computers, such as other computers 245, directly or through a network. The data communications may include transmitting and receiving instant messages. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11abg adapters for wireless network communications.

The computer and components illustrated in FIG. 2 are for explanation, not for limitation. In other embodiments, embedded systems, PDAs, cell phones, BlackBerries® and other devices which accept text entry may select text based upon patterns of the text, index the selected text, match text currently being entered by the user into an application to the indexed text, and enter a phrase of text into the application based upon the matching. In other embodiments, modules to auto-complete text may be implemented in hardware, firmware, or in state machines or may form a component of an operating system.

Figure 3:
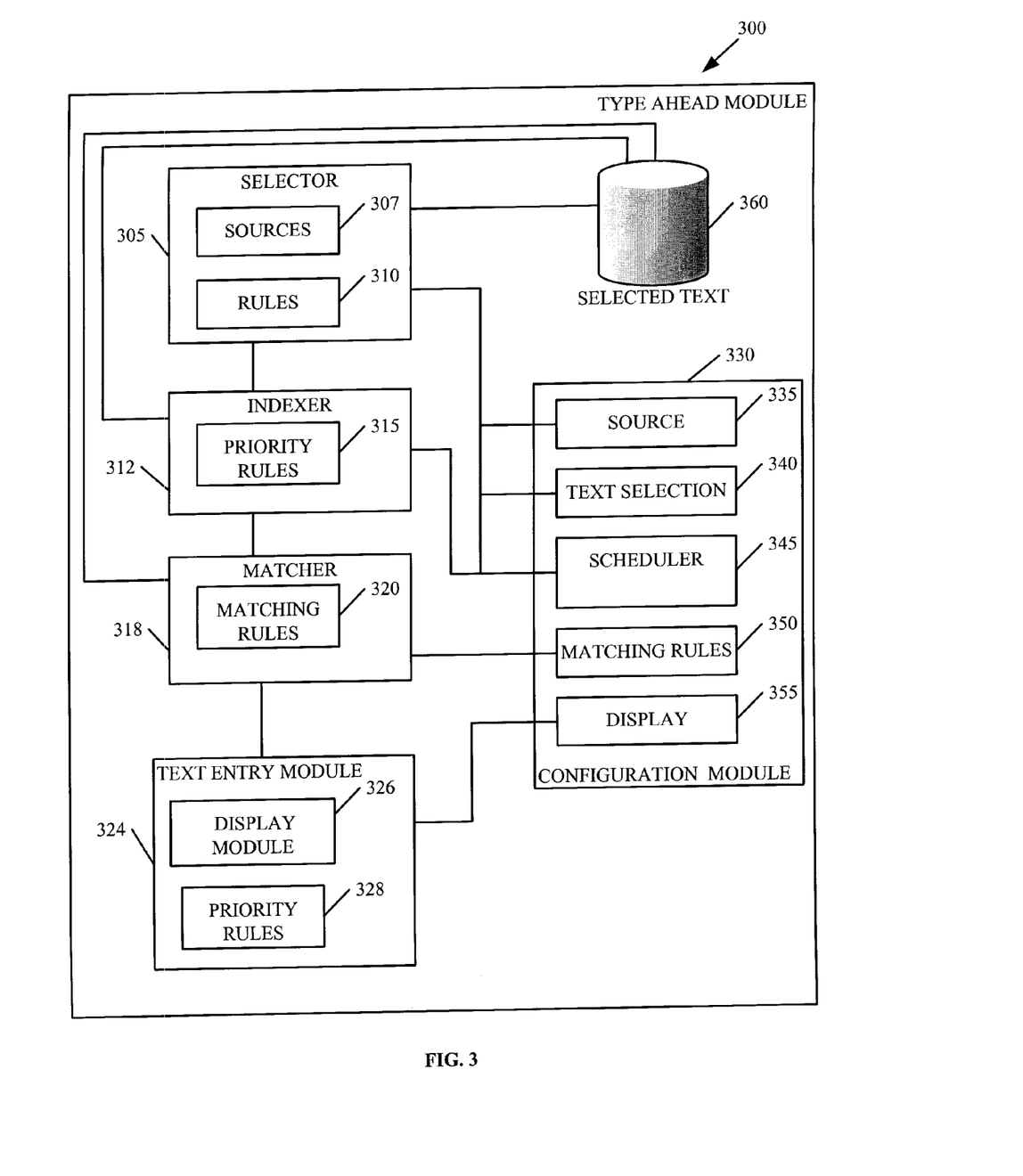
FIG. 3 depicts an embodiment of a text entry apparatus.

FIG. 3 illustrates an embodiment of a type-ahead module 300 that includes a selector 305, an indexer 312, a matcher 318, a text entry module 324, a configuration module 330, and a selected text storage module 360. Type-ahead module 300 may select text based upon patterns of the text, index the selected text, match text currently being entered by the user into an application to a portion of a segment of the indexed text, and enter a remaining portion of the segment of text into the application based upon the matching.

Selector 305 may select text entered in an application or applications based upon patterns of the text. Selector 305 includes sources 307 and rules 310. In some embodiments, selector 305 may select text entered into a single IM program, a single word-processing program, a single translation program, or another program that accepts text entry. In other embodiments, selector 305 may select text across applications. In many embodiments, selector 305 may select text entered into data files, such as address books, organizational charts, inventory lists, and other programs which track data, such as programs providing the time of day. In a few embodiments, selector 305 may select text from chat windows or word processing documents that are not saved. Selector 305 may, for example, leverage copy memory buffers available in Microsoft Word to process the latest copy text.

In the embodiment of FIG. 3, a user may specify sources of text from which selector 305 makes selections. Information about these sources may be stored in sources module 307. In some further embodiments, a user may specify directories of files from which to select text created in word-processing programs. In many further embodiments, a user may specify a cut-off date for text selection. For example, in response to a user specification, selector 305 may disregard text created in IM chat conferences more than two months earlier.

The patterns used by selector 305 to select text may be based upon the number of words in segments of the text or upon the number of letters in words of the text. Example patterns of segments of text include phrases of four or more words, phrases containing at least two words of five or more characters, or words of ten or more characters. In some embodiments, the patterns may be based upon other factors. For example, a pattern of text may consist of text that has been entered at least twice into an application whose text is a source for selector 305.

In the embodiment of FIG. 3, selector 305 operates as a rule-based pattern matcher, selecting text based upon the rules of rules module 310. In some embodiments, the rules may be represented declaratively, with rules module 310 containing a representation of a set of the rules as data. Selector 305 may apply the rules to text by processing the data. In other embodiments, rules module 310 may consist of a program into which the rules were hard-coded. Execution of the program with text as data may apply the rules to the text.

Indexer 312 may index segments of text selected by selector 305. In some embodiments, the text to which a segment of text may be matched may be used to index the segment of text. For example, in many embodiments, a segment of text selected by selector 305 may match text currently being entered by a user into an application (current text) when the current text is a beginning portion of the selected segment of text. For example, the currently entered text, "Are you on CC" may match the previously entered text "Are you on CCT Dev? It won't accept my connection because someone else is logged on." In these embodiments, indexer 312 may index a segment of text by its beginning portion. Conversely, indexer 312 may index a segment of text by multiple portions of the segment when matching may be to the middle of a phrase. Similarly, an index to a segment may contain exact words from the segment when matched words must contain the same characters, with the possible exception of case. On the other hand, when a portion of a segment of selected text may match several segments of current text, the indexing to the segment may indicate the range of matches. For example, if the matching rules permit "transmits" to match both "transmit" and "transmitted," then "transmits" may be indexed as "transmit*", where "*" represents any alphanumeric characters. As another example, if the matching rules disregard pronouns and articles, then the index to a segment of text may consist of a beginning segment stripped of pronouns and articles. Under such matching rules, "away from office" may match "I'm away from the office." The former phrase may then be used to index the latter. With this indexing scheme, a matcher could strip pronouns and articles from the current text and check for the transformed text in the index.

In some embodiments, the operations of selector 305 and indexer 312 may be controlled by a user. The user may specify whether selector 305 and indexer 312 operate incrementally, selecting and indexing newly generated text only; or whether they perform a full analysis, selecting from the complete body of text. In other embodiments, the decision whether to perform an incremental or full analysis may be built into type-ahead module 300, and not left to the discretion of a user. In embodiments in which selector 305 and indexer 312 process entries in an address book, an incremental analysis may check the address book for names that were recently added to the user's contact list and may index the information associated with the recently added names.

Similarly, in some embodiments, a user may specify the schedule for running selector 305 and indexer 312. They may, for example, run daily, every 2 days, weekly, or less frequently. When a scheduled time arrives, type-ahead module 300 may check the current I/O usage of the machine of which it is a component. If the I/O usage is moderate to low, selector 305 and indexer 312 may run at the scheduled time. Otherwise, type-ahead module 300 may wait a configurable time interval and again check the I/O usage. In a few embodiments, selector 305 and indexer 312 may operate out of schedule. They may, for example, process text in open chat windows of an IM application when a user is entering text in another window of the IM application. Alternatively, matcher 318 may attempt to match the text being entered to the text in the other windows without processing of the text in the other windows by selector 305 and indexer 312.

Indexer 312 includes priority rules 315. This module describes the order in which indexer 312 processes text. Indexer 312 may give priority to text from a certain application. In some embodiments, the priority may be based on source of text. For example, text entered into Sametime may be indexed before text entered into AIM. In many embodiments, priority may be based on date. More recent text may be indexed before earlier text.

Matcher 318 matches current text to previously entered text. The previously entered text includes text indexed by indexer 312. In some embodiments, previously entered text may also include text that has not yet been indexed; for example, because it was entered after the most recently scheduled operation of indexer 312. In further embodiments, the previously entered text may include text contained in a window currently on display. For example, in some further embodiments, matcher 318 may match text currently being entered into a chat window of an IM program to text previously entered into an open chat window of another IM program. In some embodiments, a user may invoke a command to activate matcher 318. The user may, for example, activate matcher 318 by hitting a key chord such as Ctrl-Space or Ctrl-Tab. In many embodiments, matcher 318 may begin operation only after a user has entered a minimum number of characters, such as 7, into a current application. In alternative embodiments, matcher 318 may begin matching, but display module 328 may not display possible completions and text entry module 324 may not enter text until the user has entered the minimum number of characters.

Matcher 318 includes matching rules 320. Matching rules 320 may define a match between current text and previously entered text. Typically, the two match when the current text is a beginning portion of the previously entered text. For example, the currently entered text, "Are you on CC" may match the previously entered text "Are you on CCT Dev? It won't accept my connection because someone else is logged on." In the above example, the current text is exactly the same as a beginning portion of the previously entered text. In other embodiments, the beginning portion and the current text need not be identical for the phrases to match. For example, whitespace and other non-alpha-numeric characters may be disregarded. "Hi there" may match "Hi, there." Similarly, the rules of matching rules 320 may disregard case. For example, in some embodiments, "Are you on CC" may match "are you on cct dev?"

In some embodiments, the rules of matching rules 320 may be less strict. In some further embodiments, words with the same stem may match. For example, "rules" may match "ruled" or "dictator" may match "dictatorship." In a few embodiments, the rules of matching rules 320 may disregard some words in finding matches. The rules may, for example, disregard pronouns and articles. In these embodiments, "away from office" may match "I'm away from my office. Please contact XXX in case of emergency." In several embodiments, the rules of matching rules 320 may disregard short words, such as words of three characters or fewer. In many embodiments, a user may specify the rules contained in matching rules 322.

Text entry module 324 may enter text matched with current text by matcher 318 into an application. Matcher 318 may match a portion of a segment of text to current text of the application. Text module 324 may enter the remaining portion of the segment of text into the application. When the portion of the segment of text matched to the current text is the beginning portion of the segment of text, the entry of the remaining portion amounts to auto-completion of the current text.

Text entry module 324 includes display module 326 and priority rules module 328. Display module 326 may display remaining portions of segments of text to a user through a user interface. In some embodiments, display module 326 may display possible completions in a floating window. In many of these embodiments, auto-completion module 300 is a stand-alone application that provides auto-completion for multiple other applications. In other embodiments, display module 326 may display the possible completions in-line, in the same window or other display mechanism in which the user is entering text into the application. An in-line display may consist of a scrollable window, drop-down menu bar, or other display mechanism known to those of skill in the art.

The user may select a remaining portion for entry into the application. Alternatively, the user may continue typing to further restrict the list of remaining portions. In some embodiments, if there is only one possible match, text entry module 324 may automatically enter the text into the application without selection by the user.

Priority rules module 328 may contain rules for the order of display of possible matches. Priority rules module 328, working together with selector 305, indexer 312, and matcher 318, may attempt to display first the remaining portions of segments of text most likely to be selected by a user. For example, in some embodiments, priority rules module 328 may display the most recent remaining portions first. In many embodiments, when a user enters text into an IM chat window, priority rules module 328 may first display selections from other IM chats with the other participant or participants. In some embodiments of type ahead modules used with IM programs, searching, indexing, and display may be executed in the following order:
existing memory/cache
latest IM chat history/window
opened/frequently used IM source repository (e.g. Sametime 7.5.1 and MSN NM are both in use).

Priority rules module 328 may include a learning feature. In some embodiments, as a user makes selections based upon a particular item of current text, over time the selections would be displayed in order of frequency of selection, with the most often selected shown at the top of list, the next most often selected shown second, etc.

Configuration module 330 may configure the other modules of auto completion module 300. Configuration module 330 includes source module 335, text selection module 340, scheduler 345, matching rules module 350, and display module 355. Configuration module 330 may receive specifications from a user about parameters for the operation of the other submodules of auto-completion module 300 and may set the parameters. Source module 335 may receive specifications and set parameters about the source of text for indexing and matching, such as specific directories of word-processing documents, expiration dates for selection and indexing, and auxiliary programs that provide data that may be used in text entry. Text selection module 340 may receive specifications and set rules describing text to be indexed, such as phrases of at least four words or words of at least ten characters. Scheduler 345 may receive information about the scheduling of selector 305 and indexer 312 and may set their schedules. Matching rules module 350 may receive specifications of matching rules for matcher 318. Display module 355 may set parameters regarding the display of display module 326. The parameters may, for example, determine the order in which to show possible completions, whether to automatically enter the only possible completion, and a minimal number of characters to be entered before possible completions are shown.

Selected text storage module 360 may store segments of text selected by selector 305 and indices created by indexer 312 and may be accessed by matcher 318 for segments of text that match current text. Matcher 318 may pass the matches on to text entry module 324 for display through display module 326 and entry in applications. In some embodiments, selected text storage 360 may also store attributes of the segments of text, such as their source or their creation date.

FIG. 3 is for illustration and not limitation. Some embodiments of a type-ahead module may omit some of the feature shown and many embodiments may include additional features. For example, some type-ahead modules may omit a configuration module. Many type-ahead modules may omit a selected text storage. For example, type-ahead modules which are a component of a single application may use the storage of the application. Similarly, in other embodiments of a type-ahead module, the division of functionality between modules may differ from the division shown in FIG. 3. Functions of several modules may be combined in one module, or functions of one module may be split among several.

Figure 4:
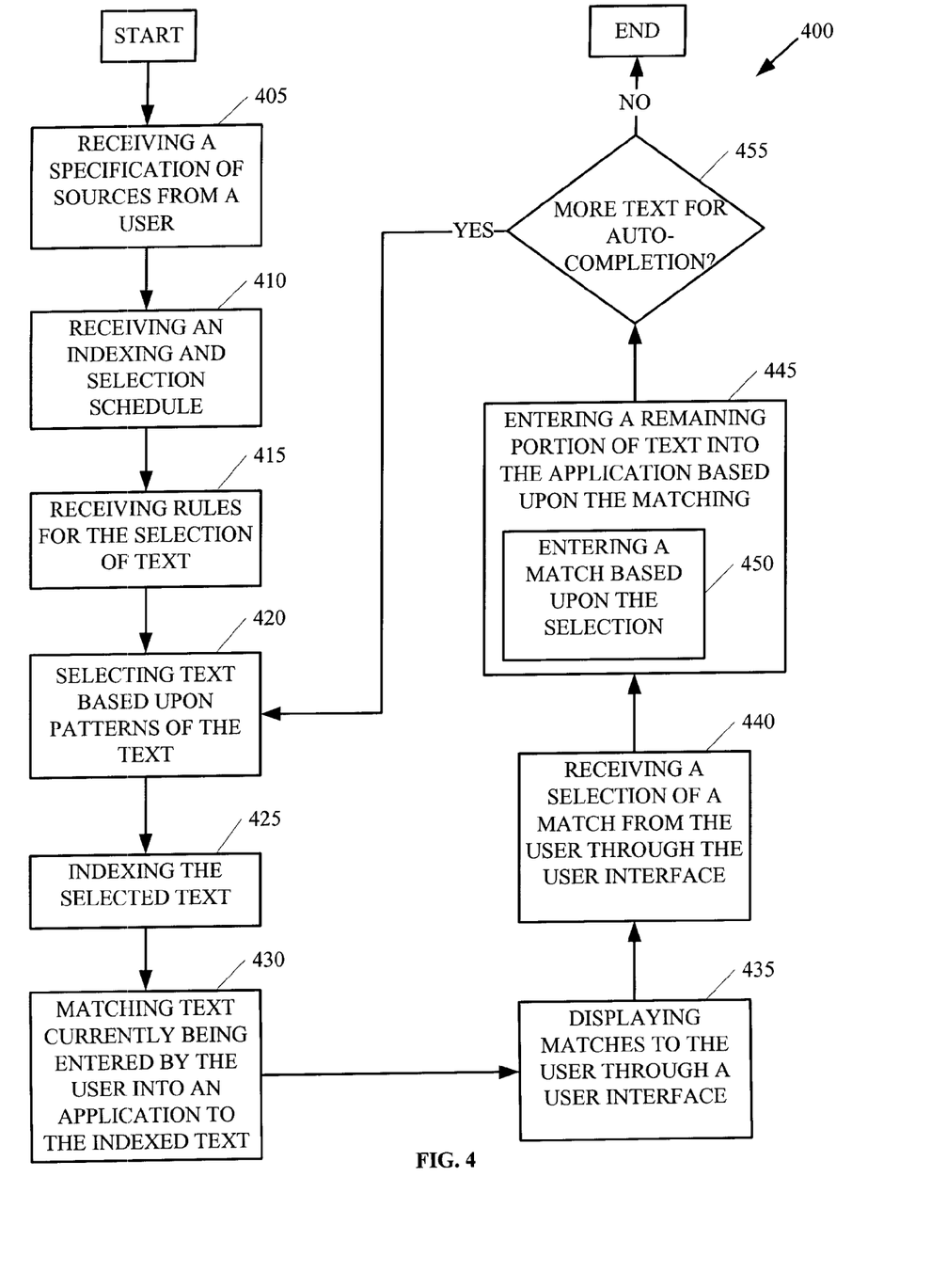
FIG. 4 is a flowchart of an embodiment of a method to enter text into applications.

FIG. 4 depicts a flowchart of an embodiment of a method to auto-complete text. The method may be performed by an apparatus such as type-ahead module 300 of FIG. 3. Flowchart 400 of FIG. 4 begins with receiving a specification of sources of text from a user (element 405). The sources may include the text entered into a single application such as an IM program; or the text entered into any of multiple applications, such as the combination of text entered into AIM and the text entered into Lotus Sametime. The user may specify a cut-off date for using previously entered text for auto-completion; directories of word processing documents; or programs or data files with information the user may wish to reference, such as address books or organizational charts.

The method may include receiving an indexing and selection schedule (element 410). This schedule may determine how often to select phrases from previously entered text and how often to index the phrases for use in auto-completing text. Typical schedules may be daily, every few days, or weekly. A scheduled selection and indexing may, however, be postponed if current I/O usage is high.

The method may include receiving rules for the selection of text (element 415). The rules may be based upon the number of words in phrases or upon the number of letters in words. The rules may also be based on other attributes of the text. For example, in some embodiments, text may be selected for use in auto-completion only if the text is found at least twice in the sources of text. A module such as type-ahead module 300 of FIG. 3 may apply the rules to select text from the specified sources. As a result, the text may be selected based upon patterns of the text (element 420). In some embodiments, the content of rules supplied by users may not provide the exclusive criteria for text selection. In some further embodiments, a type-ahead module may apply default rules in the absence of rules entered by a user. In many further embodiments, a type-ahead module may select text based upon built-in rules.

The method may include indexing the selected text (element 425). The indexing may be based upon the methods of matching used in element 430. For example, current text may match indexed text when the current text forms the beginning of the indexed text. In such cases, the indexed text may be indexed by the beginning phrase. In some embodiments, a word in current text may match a word in indexed text if the words have the same stem. In such cases, the index to the indexed text may contain the stem of the word.

The method may include matching current text to a portion of a segment of indexed text (element 430). In some embodiments, the matching may consist of searching for indexed text with the same beginning as the current text. In many embodiments, the portion of indexed text may not be identical to the current text. For example, words with the same stem may match, or articles may be ignored in finding a match.

The method may include displaying matches to the user through a user interface (element 435). The matches may consist of segments of text that begin with the current text. In some embodiments, the display may be in-line, as part of the display of the application into which the user is entering text. In other embodiments, the display may be in a floating window.

The user may select one of the indicated matches through the user interface (element 440). The user may, for example, click on a match and hit ENTER or TAB. A type-ahead apparatus may enter a remaining portion of text into the application based upon the matching (element 445). For example, if a match is to an initial portion of a segment of text, the apparatus may enter the remainder of the segment. The segment may be the segment selected by the user (element 450), or a modification of the segment, if exact matches are not required. In some embodiments, the user may then treat the text as other user-entered text. The user may perform direct in-line actions such as search, edit, copy or paste.

If the user enters addition text into an application which provides for auto-completion, elements 420 through 450 may be repeated (element 455). Otherwise, the method of flowchart 400 may end.

The method of flowchart 400 may enable a user to efficiently enter previously typed text into a text-entry window without undergoing the laborious cut-and-paste process described in the Background section. The user may recall the previously typed text by typing a few characters of the text, such as the first few words. The method may also enable a user to recall contact information for a person by typing a few characters from the person's name into the application the user is currently working with.

The elements of flowchart 400 are for illustration and not for limitation. In alternative embodiments, additional elements may be included, some of the elements of flowchart 400 may be omitted, or the elements may be performed in a different order. For example, embodiments which provide auto-completion for a single application may omit element 405. Some embodiments may omit some or all of elements 410, 415, and 420, using fixed procedures that are not configurable by a user. Table 1 includes a partial list of features of embodiments of the present invention.

TABLE 1

Partial List of Features of the Present Invention.

| No. | Feature |
|---|---|
| 1 | One portion of a user-selected indexed segment, to which text received from the user is matched, is a beginning portion of the selected indexed segment |
| 2 | One portion of a user-selected indexed segment, to which text received from the user is matched, is a middle portion of the selected indexed segment |
| 3 | Matching rules for matching the received text from the user to one portion of each indexed segment of text of a plurality of indexed segments of text |
| 4 | Matching rules, for matching the received text from the user to one portion of each indexed segment of text, may disregard pronouns and articles in the indexed segments |
| 5 | Matching rules, for matching the received text from the user to one portion of each indexed segment of text, may disregard words having no more than a designated number of characters in the indexed segments |
| 6 | Matching the received text from the user to one portion of each indexed segment of text may comprise matching one word in the received text to a different word in one indexed segment of text such that the one word and the different word have a same stem |
| 7 | Matching the received text from the user to one portion of each indexed segment of text may be initiated only after the text entered by the user comprises a specified minimum number of characters |
| 8 | Each indexed segment of text may consist of one portion of each indexed segment and a remaining portion |
| 9 | Displaying to the user the plurality of indexed segments of text may be initiated only after the text entered by the user comprises a specified minimum number of characters |
| 10 | Selection rules for selecting text for subsequent indexing may be based on phrases containing at least two words of five or more characters, or words of ten or more characters |
| 11 | Indexing of text may be performed at times based upon times selected by the user |
| 12 | Indexing of text may occur daily, every two days, or weekly in accordance with the times specified by the user |
| 13 | Selection rules for selecting text for subsequent indexing may be based on the number of letters in words of the text |
| 14 | Selection rules for selecting text for subsequent indexing may be based on the number of words in segments of the text |

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for auto-completion of text, the computer program product accessible from a computer-usable or computer-readable tangible storage device providing program code for use by or in connection with a computer or any instruction execution system. For the purposes of this description, a computer-usable or computer readable tangible storage device can be any apparatus that can, store the program for use by or in connection with the instruction execution system, apparatus, or device.

The storage device can be an electronic, magnetic, optical, or semiconductor system (or apparatus or device). Examples of a computer-readable tangible storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for text type-ahead. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of text entry, said method comprising:
    receiving, by a processor of a data processing system via a text entry program that provides a type-ahead feature for multiple applications, first text entered by a user, said received first text comprising a plurality of words;
    said processor entering, via the text entry program, the received first text into a first application;
    after said entering the received first text, said processor matching, via the text entry program, the received first text to one portion of each indexed segment of text of a plurality of indexed segments of text, said matching being based on matching rules, each indexed segment of text consisting of the one portion and a remaining portion;
    in response to said matching, said processor displaying to the user the plurality of indexed segments of text;
    said processor receiving from the user a selection of an indexed segment of text of the displayed plurality of indexed segments of text;
    in response to said receiving the selection from the user of the indexed segment of text of the displayed plurality of indexed segments of text, said processor entering into the first application, via the text entry program, the remaining portion of the selected indexed segment of text to auto-complete the received first text entered into the first application which results in auto-completed text in the first application, wherein the auto-completed text in the first application consists of (i) the received first text entered into the first application before said matching and (ii) the remaining portion of the selected indexed segment of text entered into the first application in response to said receiving the selection, and wherein the auto-completed text in the first application matches the selected indexed segment of text;
    said processor receiving second text entered by the user;
    said processor matching the second text to a portion of the first text, said first text consisting of the second text and a remaining portion of the first text, said remaining portion being a finite portion of the first text;
    said processor entering, via the text entry program, the received second text into a second application, said first and second applications being different applications; and
    after said entering the received second text into the second application, said processor entering, via the text entry program, into the second application the remaining portion of the first text to auto-complete the received second text entered into the second application which results in auto-completed text in the second application, wherein the auto-completed text in the second application consists of (i) the received second text entered into the second application and (ii) the remaining portion of the first text, and wherein the auto-completed text in the second application matches the first text.

2. The method of claim 1, wherein the matching is performed after pronouns and articles have been stripped from both the indexed segments and the received first text.

3. The method of claim 1, wherein the matching rules disregard words having no more than a designated number of characters in the indexed segments.

4. The method of claim 1, wherein said displaying is initiated only after the first text entered by the user comprises a specified minimum number of characters.

5. The method of claim 1, said method further comprising:
    said processor receiving selection rules for selecting text;
    said processor selecting text in accordance with the received selection rules; and
    before said receiving first text entered by the user, said processor indexing the selected text to generate multiple indexed segments of text which include the plurality of indexed segments of text.

6. The method of claim 5, wherein the selection rules for selecting text are based on phrases containing words of ten or more characters.

7. The method of claim 5, wherein the selection rules for selecting text are based on the number of letters in words of the text.

8. The method of claim 5, wherein the selection rules for selecting text are based on the number of words in segments of the text.

9. The method of claim 5, wherein the indexing is performed at times based upon times selected by the user.

10. The method of claim 9, wherein the indexing is performed every two days in accordance with the times selected by the user.

11. A computer program product, comprising a computer readable hardware storage device having computer readable program code stored therein, said program code configured to be executed by a processor of a computer system to implement a method of text entry, said method comprising:

said processor receiving, via a text entry program that provides a type-ahead feature for multiple applications, first text entered by a user, said received first text comprising a plurality of words;

said processor entering, via the text entry program, the received first text into a first application;

after said entering the received first text, said processor matching, via the text entry program, the received first text to one portion of each indexed segment of text of a plurality of indexed segments of text, said matching being based on matching rules, each indexed segment of text consisting of the one portion and a remaining portion;

in response to said matching, said processor displaying to the user the plurality of indexed segments of text;

said processor receiving from the user a selection of an indexed segment of text of the displayed plurality of indexed segments of text;

in response to said receiving the selection from the user of the indexed segment of text of the displayed plurality of indexed segments of text, said processor entering into the first application, via the text entry program, the remaining portion of the selected indexed segment of text to auto-complete the received first text entered into the first application which results in auto-completed text in the first application, wherein the auto-completed text in the first application consists of (i) the received first text entered into the first application before said matching and (ii) the remaining portion of the selected indexed segment of text entered into the first application in response to said receiving the selection, and wherein the auto-completed text in the first application matches the selected indexed segment of text;

said processor receiving second text entered by the user;

said processor matching the second text to a portion of the first text, said first text consisting of the second text and a remaining portion of the first text, said remaining portion being a finite portion of the first text;

said processor entering, via the text entry program, the received second text into a second application, said first and second applications being different applications; and after said entering the received second text into the second application, said processor entering, via the text entry program, into the second application the remaining portion of the first text to auto-complete the received second text entered into the second application which results in auto-completed text in the second application, wherein the auto-completed text in the second application consists of (i) the received second text entered into the second application and (ii) the remaining portion of the first text, and wherein the auto-completed text in the second application matches the first text.

12. The computer program product of claim 11, wherein the matching is performed after pronouns and articles have been stripped from both the indexed segments and the received first text.

13. The computer program product of claim 11, wherein the matching rules disregard words having no more than a designated number of characters in the indexed segments.

14. The computer program product of claim 11, wherein said displaying is initiated only after the first text entered by the user comprises a specified minimum number of characters.

15. The computer program product of claim 11, said method further comprising:

said processor receiving selection rules for selecting text;

said processor selecting text in accordance with the received selection rules; and before said receiving first text entered by the user, said processor indexing the selected text to generate multiple indexed segments of text which include the plurality of indexed segments of text.

16. The computer program product of claim 15, wherein the selection rules for selecting text are based on phrases containing words of ten or more characters.

17. The computer program product of claim 15, wherein the selection rules for selecting text are based on the number of letters in words of the text.

18. The computer program product of claim 15, wherein the selection rules for selecting text are based on the number of words in segments of the text.

19. The computer program product of claim 15, wherein the indexing is performed at times based upon times selected by the user.

20. The computer program product of claim 19, wherein the indexing is performed every two days in accordance with the times selected by the user.

21. A computer system comprising a processor, a memory, and a computer readable hardware storage device, said storage device containing program code configured to be executed by the processor via the memory to implement a method of text entry, said method comprising:

said processor receiving, via a text entry program that provides a type-ahead feature for multiple applications, first text entered by a user, said received first text comprising a plurality of words;

said processor entering, via the text entry program, the received first text into a first application;

after said entering the received first text, said processor matching, via the text entry program, the received first text to one portion of each indexed segment of text of a plurality of indexed segments of text, said matching being based on matching rules, each indexed segment of text consisting of the one portion and a remaining portion;

in response to said matching, said processor displaying to the user the plurality of indexed segments of text;

said processor receiving from the user a selection of an indexed segment of text of the displayed plurality of indexed segments of text;

in response to said receiving the selection from the user of the indexed segment of text of the displayed plurality of indexed segments of text, said processor entering into the first application, via the text entry program, the remaining portion of the selected indexed segment of text to auto-complete the received first text entered into the first application which results in auto-completed text in the first application, wherein the auto-completed text in the first application consists of (i) the received first text entered into the first application before said matching and (ii) the remaining portion of the selected indexed segment of text entered into the first application in response to said receiving the selection, and wherein the auto-completed text in the first application matches the selected indexed segment of text;

said processor receiving second text entered by the user;

said processor matching the second text to a portion of the first text, said first text consisting of the second text and a remaining portion of the first text, said remaining portion being a finite portion of the first text;

said processor entering, via the text entry program, the received second text into a second application, said first and second applications being different applications; and after said entering the received second text into the second application, said processor entering, via the text entry program, into the second application the remaining portion of the first text to auto-complete the received second text entered into the second application which results in auto-completed text in the second application, wherein the auto-completed text in the second application consists of (i) the received second text entered into the second application and (ii) the remaining portion of the first text, and wherein the auto-completed text in the second application matches the first text.

22. The computer system of claim 21, wherein the matching is performed after pronouns and articles have been stripped from both the indexed segments and the received first text.

23. The computer system of claim 21, wherein the matching rules disregard words having no more than a designated number of characters in the indexed segments.

24. The computer system of claim 21, wherein said displaying is initiated only after the first text entered by the user comprises a specified minimum number of characters.

25. The computer system of claim 21, said method further comprising:

said processor receiving selection rules for selecting text;

said processor selecting text in accordance with the received selection rules; and before said receiving first text entered by the user, said processor indexing the selected text to generate multiple indexed segments of text which include the plurality of indexed segments of text.

26. The computer system of claim 25, wherein the selection rules for selecting text are based on phrases containing words of ten or more characters.

27. The computer system of claim 25, wherein the selection rules for selecting text are based on the number of letters in words of the text.

28. The computer system of claim 25, wherein the selection rules for selecting text are based on the number of words in segments of the text.

29. The computer system of claim 25, wherein the indexing is performed at times based upon times selected by the user.

30. The computer system of claim 29, wherein the indexing is performed every two days in accordance with the times selected by the user.

* * * * *